UNITED STATES PATENT OFFICE.

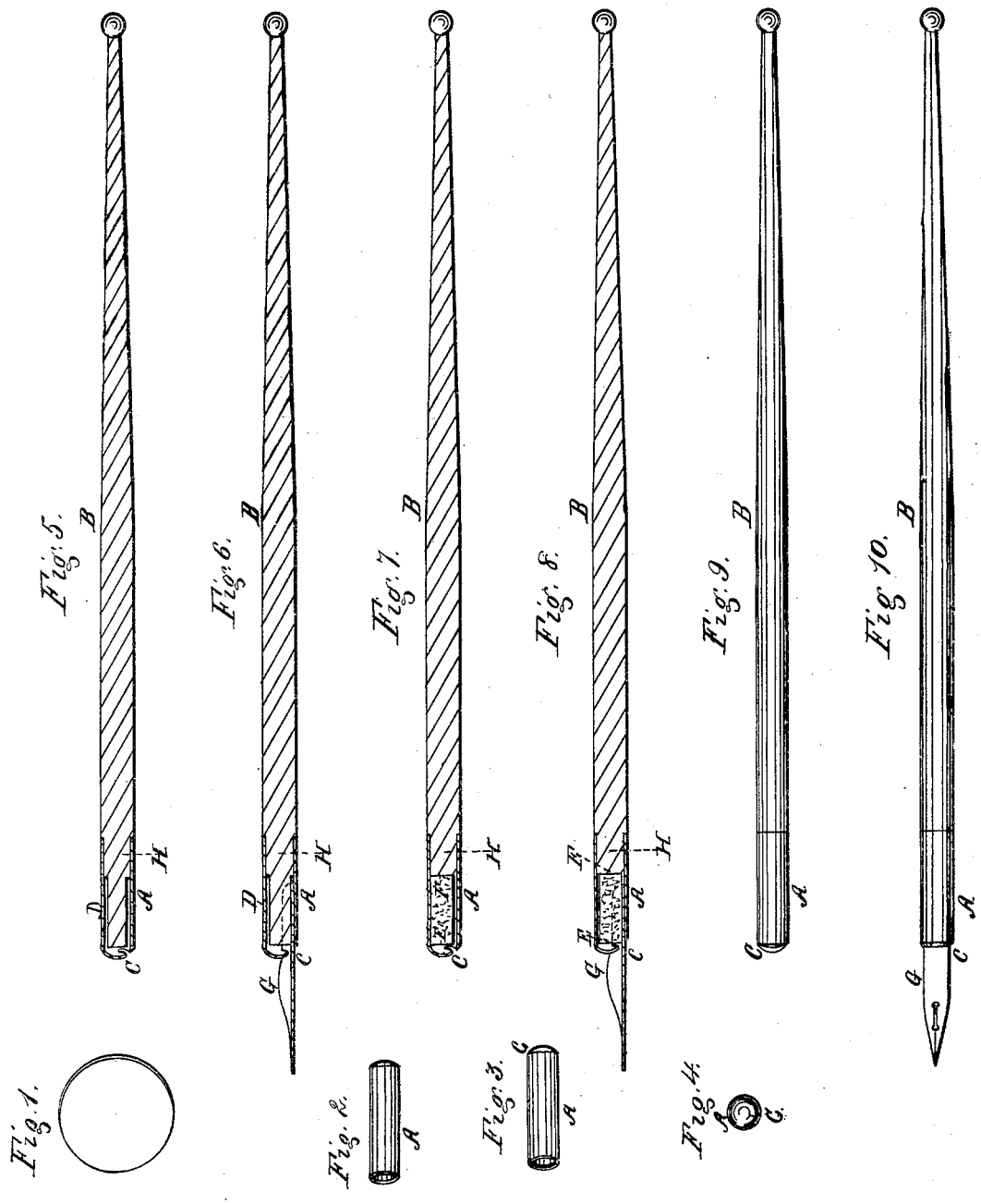

JOSEE JOHNSON, OF NEW YORK, N. Y.

PENHOLDER.

Specification of Letters Patent No. 21,758, dated October 12, 1858.

*To all whom it may concern:*

Be it known that I, JOSEE JOHNSON, of the city, county, and State of New York, have invented certain new and useful Improvements in Penholders for Holding Pens for Writing Purposes; and I do hereby declare that the following is a full and exact description of the same, reference being had to the accompanying drawings and to the letters of reference marked thereon.

Figure 1, represents the blank cut from the sheet brass or other metal, of which the seamless thimble A is made. Fig. 2, represents the thimble A formed of the blank. Fig. 3, thimble A, with incision C, made to receive the pen G. Fig. 4, end view of thimble A showing incision G. Fig. 5, is a section representing seamless thimble A attached to penstock B, showing the penstock as closely fitting thimble A, at H; D, the open space between penstock and thimble and incision C at the bottom of thimble to receive the pen. Fig. 6, is same as Fig. 5, save that, the pen is inserted at G. Fig. 7, represents the thimble A, and penstock B, attached together as seen in Fig. 5, except that, the penstock terminates at F, the space between the stock, and bottom of the thimble being filled with cork or other elastic substance. Fig. 8, is a section of the same, the pen being inserted in the incision C passing between the cork, and the inner side of the thimble A. Fig. 9, represents a finished penholder with thimble A, and penstock, B, attached, showing the incision c for the insertion of the pen. Fig. 10, is the same as Fig. 9, with pen inserted ready for use.

The nature of my invention consists in making pen holders of seamless thimbles formed with one solid or closed end, the solid end being perforated so as to form a similar incision for the reception of the pen; the incision is cut in such a manner as to allow the pen to pass against the innerside of the thimbles between the thimble and penstock, or any other suitable substance in the thimble. In this manner the pen is conveniently attached or detached, and is held sufficiently firmly by coming in contact with the end of the pen stock, or some elastic substance that may be placed in the thimble for that purpose.

To enable others skilled in the art to make and use my invention, I will describe its construction and operation.

The seamless thimble of which I propose to make pen holders for writing, is raised with dies from solid blanks as seen in Fig. 1, of brass or other suitable material, and has one solid or closed end, and are thus formed by the operation of the dies. These thimbles should be made about one inch long, and in diameter to suit the demand, the thickness of the material being the same as in ordinary pen holders. The solid end of the thimble is full, or round as seen in drawings, to give strength and finish; a little incision is made to one edge of the thimble at C, in circular form, and of size and shape to receive the pen and hold it in a proper position for use when the pen is inserted in the incision with one end resting on the penstock or elastic substance, as seen in Figs. 7 and 8. The penstock B, and thimble A, may be attached as seen in Figs. 5, 6, 7, and 8, and the pen may be inserted as seen in Figs. 6 and 8. When the thimble and penstock are attached in either way they form a complete pen holder as seen in Figs. 9 and 10 which show their neatness and durability.

Having thus fully described the construction and operation of my invention: what I claim as new, and desire to secure by Letters Patent; is,—

The thimble A with incision C, when formed of one piece of metal and applied to penstock B, as a pen holder operating as described and for the purposes set forth.

JOSEE JOHNSON.

Witnesses:
R. P. WALKER,
HIRAM FENN.